(12) United States Patent
Nakano et al.

(10) Patent No.: US 7,035,044 B2
(45) Date of Patent: Apr. 25, 2006

(54) MAGNETIC DISK DEVICE HAVING A LOW-PROFILE MOTOR WITHOUT DETERIORATION IN THE STRENGTH OF THE ENCLOSURE

(75) Inventors: Asao Nakano, Yokohama (JP); Yuji Fujita, Yokohama (JP); Yasuo Amano, Yokohama (JP); Nobuyuki Ushifusa, Yokohama (JP); Koki Uefuna, Odawara (JP); Takashi Yamaguchi, Tsuchiura (JP); Toshiyuki Ajima, Hitachi (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 0 days.

(21) Appl. No.: 10/220,371

(22) PCT Filed: Jun. 10, 2002

(86) PCT No.: PCT/JP02/05735

§ 371 (c)(1),
(2), (4) Date: Mar. 4, 2003

(87) PCT Pub. No.: WO02/101906

PCT Pub. Date: Dec. 19, 2002

(65) Prior Publication Data

US 2003/0227712 A1    Dec. 11, 2003

(30) Foreign Application Priority Data

Jun. 11, 2001 (JP) .............................. 2001-174990
Jun. 5, 2002 (JP) .............................. 2002-164562

(51) Int. Cl.
*G11B 17/08* (2006.01)
(52) U.S. Cl. .............................. 360/98.07; 360/99.08
(58) Field of Classification Search ............. 360/98.07, 360/99.08
See application file for complete search history.

(56) References Cited

U.S. PATENT DOCUMENTS

| 3,299,335 A | | 1/1967 | Wessels |
| 5,528,436 A | * | 6/1996 | Peter ........................ 360/99.08 |
| 5,761,000 A | * | 6/1998 | Ahn .......................... 360/99.08 |
| 5,822,152 A | * | 10/1998 | Seaver et al. ............. 360/99.08 |
| 6,208,485 B1 | | 3/2001 | Chainer et al. |

FOREIGN PATENT DOCUMENTS

| EP | 1239485 A2 | 9/2002 |
| JP | 43-8771 | 3/1963 |
| JP | 05-176507 A | 7/1993 |
| JP | 06-068592 A | 3/1994 |
| JP | 07-182771 A | 7/1995 |
| JP | 2000-100060 A | 4/2000 |

* cited by examiner

*Primary Examiner*—A. J. Heinz
(74) *Attorney, Agent, or Firm*—Townsend and Townsend and Crew LLP

(57) ABSTRACT

A magnetic disk drive includes a base constituting at least a face included in an enclosure; a shaft secured to the base; a rotor which rotates around the shaft as a rotary axis; a stator for rotating the rotor; and a magnetic disk secured to the rotor; wherein the stator is disposed on a face facing the base. This improves durability of the magnetic disk drive.

6 Claims, 4 Drawing Sheets

| STATER THICKNESS (mm) | 0.35 | 0.7 | 1.05 | 1.4 |
|---|---|---|---|---|
| NUMBER OF SOFT MAGNETIC CORE LAYERS (THICKNESS 0.1mm) | 2 | 4 | 6 | 8 |
| WIRING LAYER CONDUCTOR LAYER THICKNESS: 40μm INSULATOR LAYER THICKNESS: 35μm | 2 | 4 | 6 | 8 |
| COIL NUMBER OF TURNS | 20 | 40 | 60 | 80 |
| COIL DC RESISTANCE (Ω) | 3 | 6 | 9 | 12 |
| TORQUE CONSTANT (mNm/A) | 0.9 | 1.8 | 2.7 | 3.6 |

MAGNETIC DISK DEVICE HAVING A LOW-PROFILE MOTOR WITHOUT DETERIORATION IN THE STRENGTH OF THE ENCLOSURE

TECHNICAL FIELD

The present invention relates to a magnetic disk drive.

BACKGROUND ART

In recent years there has been a demand for magnetic disk drives with an increased capacity and a reduced size. Magnetic disk drives having a flat-external dimension of 1.0 inch are brought to the commercial stage in the level of current products.

The conventional magnetic disk drives have an in-hub motor configuration or under-hub motor configuration. The in-hub motor is configured such that a magnetic circuit including a rotor and a stator is disposed inside the center hub of a spindle on which disks are stacked, which is now in most widespread use. The under-hub motor is configured such that a magnetic circuit including a rotor and a stator is disposed nearer a base than a hub portion on which disks are stacked.

The configuration described in Japanese Patent Laid-open No. 6-68592 is an example of disk drive configurations using the in-hub motor.

As shown in FIG. 2 of the above publication, this configuration employs a shaft-fixed type in-hub motor, in which a hub is disposed on a shaft secured to a base by way of bearings, magnets constituting a rotor are disposed inside the hub, and a stator is disposed on the base.

It is Japanese Patent Laid-open No. 7-182771 that discloses a magnetic disk drive configuration using the under-hub motor.

As shown in FIG. 2 of this publication, this configuration employs a shaft-fixed type under-hub motor, in which a hub is disposed on a fixed shaft secured to a base by way of bearings, magnets constituting a rotor are disposed below the hub, and a stator is disposed on the base.

There has been an increase in demand for a low-profile magnetic disk drive in recent years. Although the overall drive can be thinned in principle by making individual components thin, these components include ones impossible to make thin simply. One of them is an enclosure.

Since a shaft is a central axis around which a hub rotates irrespective of a shaft-rotary type or the shaft-fixed type, a portion of a base positioned near the shaft needs a certain thickness so as to withstand a large force exerted on the shaft. In addition, the base needs mass that overcomes a force due to the rotation of the hub.

Therefore, it is preferable for a characteristic of a recess provided on the base that the recess be provided at a position away from the shaft. In addition, preferably as the recess is provided at a position nearer the shaft, the area of the recess should be made smaller.

However, since the stator is formed so as to cover the shaft in the above prior art, if it is intended to make a low-profile device by lowering the position of the stator to the base side, it is inevitable to form the recess circularly or annularly in the base around the shaft. That is, the prior art has not taken into consideration that the enclosure is made thinner with care taken to the durability thereof.

In addition, the prior art simple describes that the stator is mounted on the base; no consideration is given to the arrangement among the stator and other members, more specifically, the relation between the stator and the enclosure facing the base; furthermore, a change in the strength of the enclosure itself is not taken into consideration.

That is, an object of the present invention is to make a magnetic disk drive thinner with the durability of an enclosure improved.

Besides the enclosure, components impossible to make smaller include a spindle motor and a battery.

For a magnetic disk, it is necessary to retract a magnetic head from the surface of the magnetic disk, where the magnetic head is placed, before rotation of the spindle motor is stopped. When this is carried out in a normal operation, an external power source is used for it; however, in the event of unplanned power interruption, the external power source cannot be used.

In order to perform such operation, an internal power source connected to a motor (VCM) for shifting the magnetic head is needed, and in general a battery performs the function. A large-scaled battery with a large capacity is inevitably selected because of a battery capacity necessary for the battery.

If small batteries are dispersedly mounted on a board, this poses problems that performance is degraded due to wiring resistance, a mounting area is increased, and so forth. Concrete measures to solve the problems are not taken into consideration.

Accordingly, another object of this invention is to prevent a deterioration in the durability of an enclosure as well as to reduce a battery mounting area, and to downsize a magnetic disk drive as well as to thin the drive down.

DISCLOSURE OF INVENTION

According to one aspect of the present invention to achieve the above objects, there are provided a base constituting at least a face included in an enclosure; a shaft secured to the base; a rotor which rotates around the shaft as a rotary axis; a stator that rotates the rotor; and a magnetic disk, the stator being disposed on a face facing the base. Since the stator is disposed not on the base but on the face facing the base in this aspect, a portion of an area far from the shaft may be reduced, whereby a thickness required for a portion of the base in the vicinity of the shaft can be secured. In other words, the employment of the configuration of this aspect can make a magnetic disk drive thin while suppressing a deterioration in durability of the enclosure.

According to another aspect of the prevent invention, there are provided a soft magnetic metal plate, wiring disposed on opposite surfaces of the soft magnetic metal plate, and a through hole bringing the wiring disposed on the opposite surfaces of the soft magnetic metal plate into conduction, and the wiring and the through hole are spirally configured to form a coil. With this configuration, since the board manufacturing process can be used as it is, a stator can be made thin. Since the manufacturing process of electronic circuit boards (a printed board manufacturing technique) is employed, an electronic board and a stator core can be formed from the same material. In addition, if they are made from the same material, they are made by one operation, whereby a magnetic disk drive can be made thin while suppressing a deterioration in durability of an enclosure.

BEST MODE FOR CARRYING OUT THE INVENTION

Hereinafter, a description will be made of a configuration of a magnetic disk drive according to the present invention with reference to the drawings.

The magnetic disk drive principally includes a magnetic head positioning mechanism, a magnetic disk, an enclosure (a cover and a base) made of aluminum, a connector, a stator, a rotor portion, and a stator portion. The device has the same outer dimensions (43 mm×36 mm×3.3 mm) as a compact flush memory type 1 does.

Figure 1:
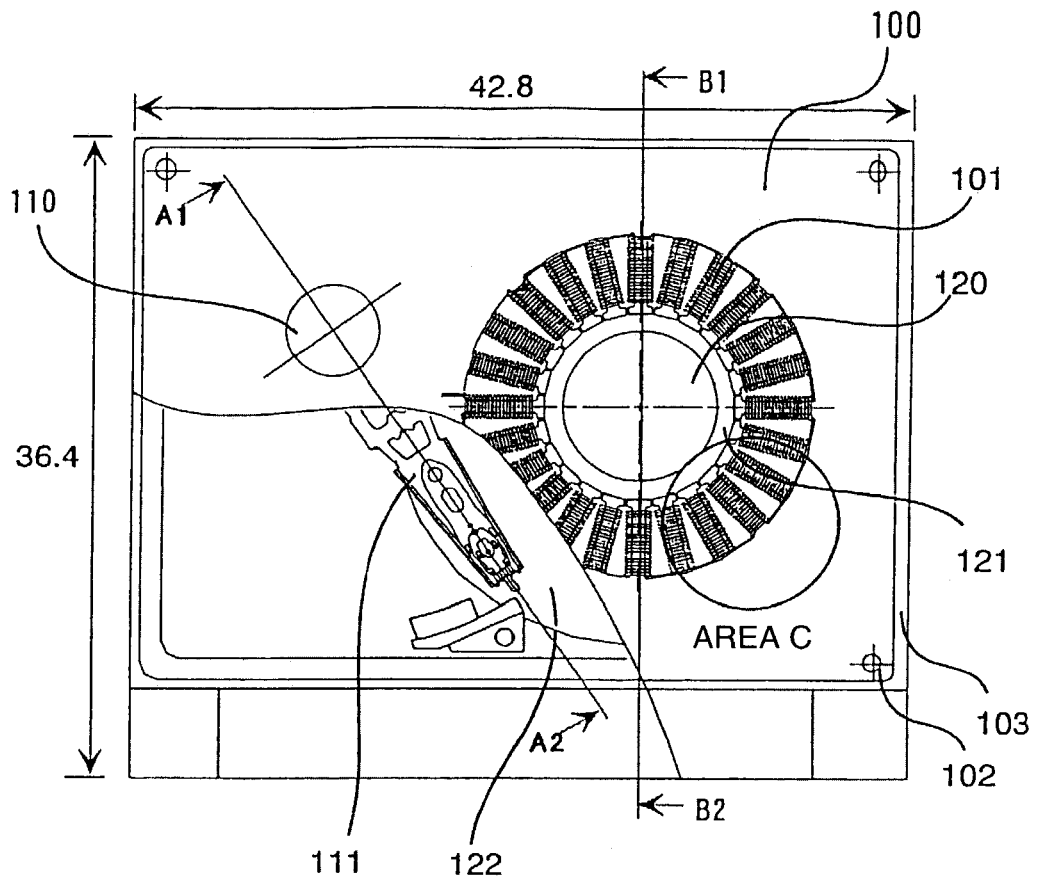
FIG. 1 is a top view of a magnetic disk drive.

FIG. 1 is a top view of the magnetic disk drive with a cover placed at the upper surface of the enclosure of the drive removed. Incidentally, in an actual magnetic disk drive, a board including a stator is bonded to an upper cover with adhesive before the board is fixedly screwed to the upper cover.

In FIG. 1, reference numeral 100 denotes a metal core wiring board 100 including a soft magnetic metal plate as a core material. The metal core wiring board 100 is provided with two holes in general. These two holes are provided for the magnetic head positioning mechanism 110 and a magnetic disk rotation central shaft 120, respectively. The magnetic head positioning mechanism 110 includes an arm 111 on which a magnetic head is mounted. A rotor magnet (permanent magnet) 121 and a magnetic disk 122 disposed below the wiring board are disposed in the hole 120. A stator coil 101 and wiring are formed in areas other than the holes of the metal core wiring board 100. Incidentally, numeral reference 102 denotes a screw hole for securing the metal core wiring board to the enclosure 103.

Figure 2:
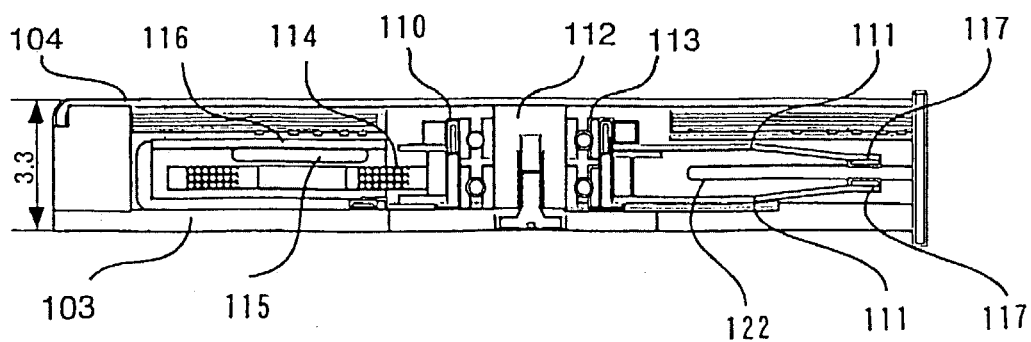
FIG. 2 is a sectional view of FIG. 1, taken along line A1–A2.

Part of the configuration of the magnetic disk drive according to the invention will be described with reference to FIG. 2 showing a sectional portion taken along line A1–A2 in FIG. 1. The magnetic head positioning mechanism 110 is rotatably mounted to a fixed shaft 112 by way of a bearing 113. The magnetic head positioning mechanism 110 is provided with a coil assembly 114 of a voice coil motor (VCM) for positioning the magnetic head 117 and a head arm assembly 111 on which the magnetic head 117 is mounted. The coil assembly 114 is disposed between a magnet 115 and a yoke 116. The VCM of the magnetic head positioning mechanism is composed of the members 110 to 116. An inside mechanism protection cover 104 of the magnetic disk drive is provided on a side facing the enclosure 103.

Figure 3:
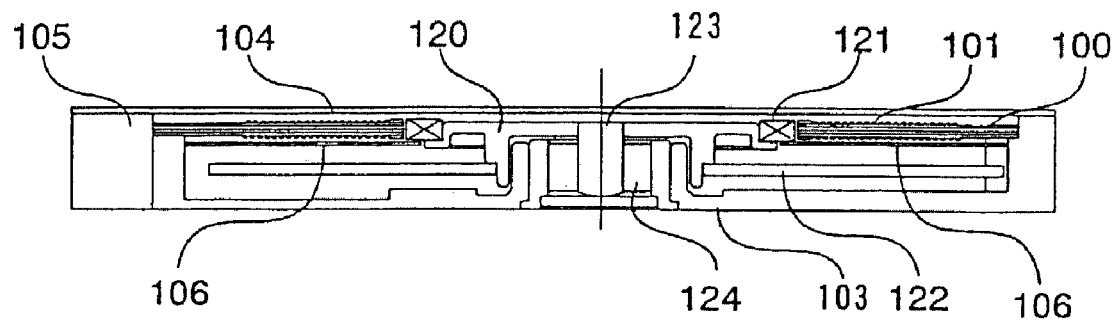
FIG. 3 is a sectional view of FIG. 1, taken along line B1–B2.

Part of the configuration of the magnetic disk drive according to the invention will then be described with reference to FIG. 3 showing a section taken along line B1–B2 in FIG. 1. The rotor magnet 121 and the magnetic disk 122 are mounted to the magnetic disk rotation central shaft 120, which is a center around which the magnetic disk turns. The magnetic disk rotation central shaft 120 is mounted to the bearing 124 by way of a movable rotary shaft 123. The bearing is secured to the enclosure 103. A hub is a generic name for the members 120, 121, 123 and 124 that transmit rotation to the magnetic disk.

A connector 105 having a plurality of signal pins formed thereon is disposed at an end of the metal core wiring board 100 to send or receive an electrical signal to or from the outside. A sealing resin is applied to the inside of a housing of the connector and then cured with heat so as to seal through holes formed in the connector. This is to prevent dust entering from the outside from sticking to the surface of the magnetic disk. A magnetic shield thin plate 106 is mounted on the metal core wiring board.

The stator is bonded to the inside of the cover overlapping the magnetic disk; the inside of the cover is positioned in a centrifugal direction, relative to the annular permanent magnet, of the shaft around which the rotor turns.

As shown in FIGS. 2 and 3, since the metal core wiring board 100 in which the core is made by stacking soft magnetic metal plates is bonded to the cover that is the upper portion of the enclosure, the metal core wiring board 100 substantially constitutes the upper surface member of the enclosure. Therefore, the upper surface of the enclosure is enhanced in strength; the overall magnetic disk drive is improved in impact-resistance and can be made thinner.

In addition, since the metal core wiring board is used as the core of the stator, which is stronger in shock than other members, the thin small-sized magnetic disk drive is realized while the overall drive is improved in durability to shock.

The connector having the plurality of signal pins formed thereon is disposed at the end of the cover to send or receive an electrical signal to or from the outside. The sealing resin is applied to the inside of the housing of the connector and then cured with heat so as to prevent dust entering from the outside from sticking to the surface of the magnetic disk, thereby sealing the through holes for physical electrical connection with formed terminal pins.

Figure 4:
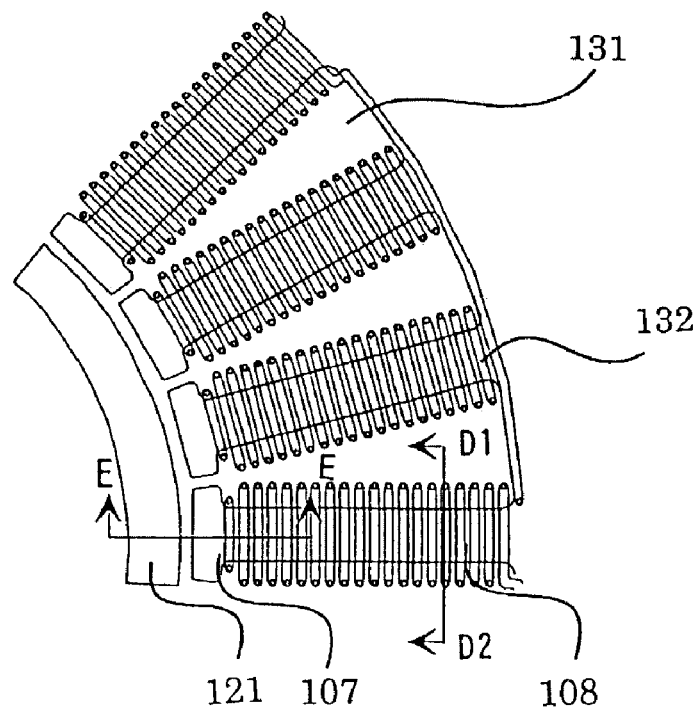
FIG. 4 is an enlarged view of an area C in FIG. 1.

A description will then be made of the relation between the stator and the rotor magnet with reference to FIG. 4 which is an enlarged view of an area C in FIG. 1.

Tip portions 107 of stator poles (core pieces) are disposed via radial gaps outside the annular rotor magnet (permanent magnet) 121, which is divided, and magnetized, into 16 poles in a circumferential direction; the rotor magnet 121 is provided at the generally outer end of the rotor. Stator poles 108 have 24 poles which are 1.5 times the number of poles of the annular permanent magnet. The rotor is rotated by a magnetic force produced between the tip portions 107 of the stator poles and the rotor magnet 121.

The stator has as a core a stack of the soft magnetic metal plates made of silicon iron. Coils in which wires and through holes are connected to each other in a winding manner are disposed around the stator poles 108 by way of insulating films. An electric current supplied to the stator coil is controlled so as to control a magnetic field fed to the rotor magnet, which produces torque rotating the rotor portion. FIG. 4 shows the coils formed by means of a method for manufacturing a wiring board. The stator poles 108 made of silicon iron core are insulated by an organic insulating material, and a thin metal plate made of copper is etched on the organic insulating material, whereby wiring is formed like a large number of strips. The wiring layer 132 is part of the stator coil.

Figure 5:
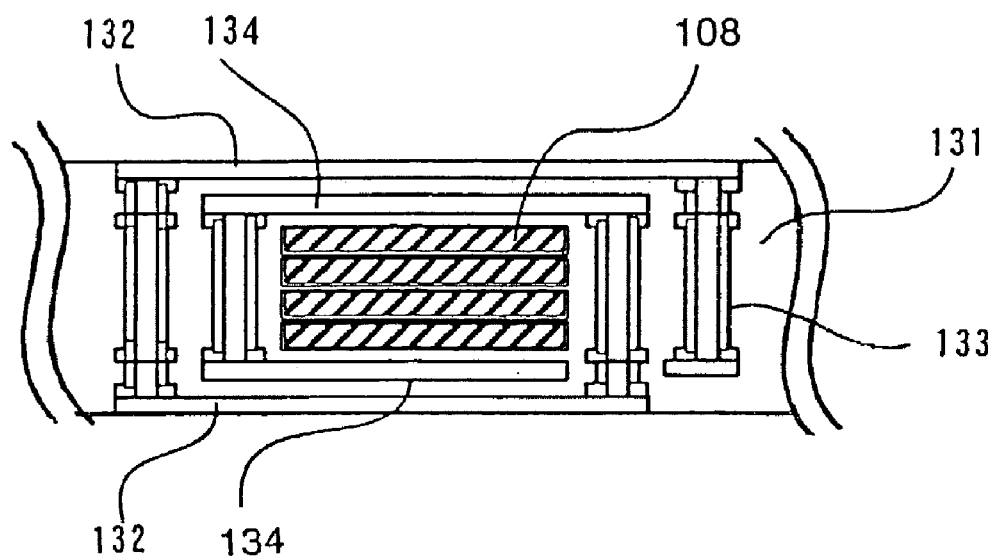
FIG. 5 is a sectional view of FIG. 4, taken along line D1–D2.

The coil for stator pole will be described with reference to FIG. 5 which is a sectional view taken along line D1–D2 in FIG. 4. In this embodiment, there are provided four layers of the stator cores, and four wiring layers, that is, two wiring layers each placed above and under the stator core layer. The stator pole is covered in the circumference thereof with an organic insulating material 131. Through holes are bored in portions of the organic insulating material so as to extend through from the front to back thereof, and then the inside of the through holes are subjected to conductive processing with plating, thereby forming two-side conductive wiring 133. This wiring is connected to the four, front and back wiring layers 132, 134 so as to form double spirals, and then this connection is continued in the direction of the central axis E1–E2 of the stator pole in FIG. 4, thereby forming the stator coil. If the wiring layer is one pair of the front and back, a single spiral is formed.

Figure 6:
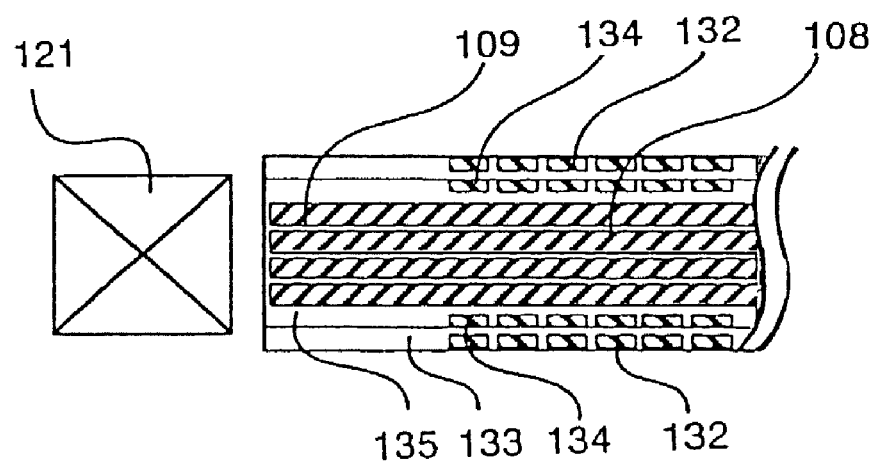
FIG. 6 is a sectional view of FIG. 4, taken along line E1–E2.

A configuration of the stator pole will be described in detail with reference to FIG. 6 which is a sectional view taken along E1–E2 in FIG. 4. The stator pole includes a coil forming portion and the tip portions 107 of the stator pole in which no coil is formed. The tip portion of stator pole 107 which is the core portion of the stator pole has three bonding insulating layers 109 and four layers of stator poles made of soft magnetic metal plates, which are alternately stacked to form seven layers of cores in total. To form a double wound coil, the coil forming portion includes the wiring layers 132, 134 disposed on the front and back of the soft magnetic plate core layer of the stator pole and four coil layers, using the bonding insulating material 131, formed for each of the front and back. The end face, on the rotor permanent magnet 121 side, of the tip portion of the stator pole 107 is covered with the organic insulating layer 109 to protect the silicon core material.

A minimum value of thickness of the stator is determined by an electric current value that a spindle motor needs to rotate a rotating body at a certain number of rotation; the rotating body in which the magnetic head is disposed via the air gap includes the rotor and the magnetic disk.

In the spindle motor, the stator has 24 poles, and four layers of silicon iron each having a thickness of 0.1 mm; the metal wiring layer of the coil portion is 40 μm in thickness; the stator is 0.7 mm in thickness with the insulator layer being 35 μm in thickness; the stator coil is 150 μm in line width and 100 μm in line interval; and the through hole portion has 40 turns in the number of winding per pole with 100 μm in outside diameter and 60 μm in inside diameter. Meanwhile, when the torque constant of the motor was determined with the rotor magnet being 16 poles, 13.2 mm in outside diameter, and 0.7 mm in thickness, it was about 0.0018 Nm (Newton meter) per 1 A in electric current. The stator coil was about 6 Ω in DC resistance. The spindle motor was about 0.00011 Nm in steady-rotation torque. Accordingly, the spindle motor operates at about 60 mA in steady current.

Torque constant (Kt) of a motor is generally represented by the following expression;

$$Kt = A \times Wb \times N \times Ns \quad (1)$$

where A is constant, Wb is a magnetic flux density between a rotor and a stator, N is the number of winding coils per pole of the stator, and Ns is the number of poles per phase of the motor.

Figures 7, 8:
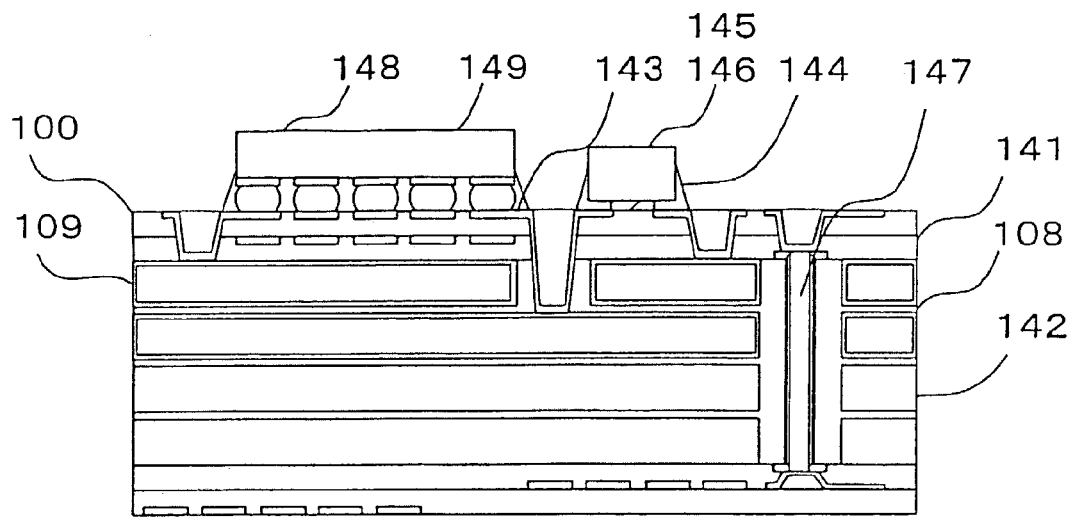
FIG. 7 is a sectional view of an electronic circuit forming portion of a metal core wiring board.
FIG. 8 is a table indicative of stator thicknesses and motor performances.

Assuming that the thickness of the stator portion is the same as that, in an axial direction, of the rotor magnet on the basis of the present embodiment, and the wiring rule of the stator coil is constant, when motor characteristics are calculated with the thickness of the stator changed, numerical values as shown in FIG. 8 can be obtained.

Taking a stator 0.35 mm thick as an example, when an actual wiring board is taken into consideration, a single-sided one layer is insufficient for the wiring layer; therefore, it is necessary to consider single-sided two wiring layers. The following will be considered as measures to be taken: a first case is that the thicknesses of the coil and insulator layer are halved to keep the total thickness thereof to 0.35 mm; and a second case is that only the core is made 0.2 mm thick and four wiring layers are used as they are and thereby the total thickness thereof is made 0.5 mm.

In this consideration, the two cases are different from each other in only their respective DC resistances of the stator coils; the first case is 12 Ω while the second case is 6 Ω. The saturated magnetic flux density of the stator pole (1.5 T) leads a saturated current into about 0.62 A. The electric current in the steady rotation is 60 mA within the range in which the stator pole is not saturated, which is equivalent to the example of 0.7 mm thick. In addition, the maximum torque is about 60%, which can still be used for a spindle motor. It will be understood that the present embodiment can configure a low-profile motor which has a stator including a metal core wiring board of a thickness greater than 0.35 mm.

On the other hand, a limit of greater side thickness of the stator depends on a technique of forming the conductive wiring which uses the front/back through hole for the coil forming the stator pole. In the consideration of the technique according to the embodiment, through holes of 0.11 (aspect ratio 10) were bored in a stator stack core 1.1 mm thick and conductive plating was applied to the inside walls of the through holes, which caused variations in plating-thickness. This has an effect on variations in DC resistance of the coil, which has an effect on characteristics and manufacturing yields. If it is possible to apply stable plating to the inside of the through holes with a larger aspect, also a stator core having a thickness of 1.1 mm or more may be used. Thus, it will be understood that according to the manufacturing technique of this embodiment the stator which measures 1.4 mm in thickness, that is, the stator core 1.1 mm in thickness and the wiring layers 0.3 mm in thickness, gives an upper limit thickness of a low-profile motor which uses the metal core wiring board.

The present embodiment has configured a magnetic disk drive which has the outer dimensions of 42.8 mm wide by 36.4 mm deep by 3.3 mm thick with the use of two sets of magnetic head arm assemblies each 0.85 mm thick, a magnetic disk 0.4 mm thick, and a metal core board 0.7 mm thick. If one set of magnetic head arm assembly is used and the thickness of the metal core board is selected on the basis of motor characteristics, a magnetic disk drive having a thickness in the range of 2.5 mm to 4.0 mm can be realized.

In particular, if one set of magnetic head assembly and a magnetic disk of about 0.7 inch in diameter are employed, a magnetic disk drive having the outer dimensions of 21.5 mm wide by 50.0 mm deep by 2.8 mm thick can be realized.

A description will then be made of a power supply layer with low impedance and low DC resistance referring to FIG. 7. This figure is a sectional view of an electronic circuit forming portion of the metal core wiring board. Via holes 142 for through holes in a stator portion and an electronic board portion are formed in two of the stator poles 108 made of soft magnetic metal plates, and thereafter, copper-plating 141 is applied to the surface thereof. Taking the thickness of an insulating material consideration so that a distance between the two soft magnetic metal plates is made 5 to 30 μm after formation of the metal core wiring board, an insulating-bonding layer 109 is interposed between the two plates to form a stacked plate. If a silicon steel plate is used as the soft magnetic metal plate, its volume electric resistance is about 10 μΩcm. A cupper plating film of about 5 μm thickness is formed on the soft magnetic metal plate, cupper being about 1.7 μΩcm in volume electric resistance. The soft magnetic metal plate and the cupper plating film are used for an entire ground layer and the power supply layer, which provides low impedance in a high frequency region susceptible to the skin effect.

Semiconductor devices and the like are connected to the power supply layer or the ground layer by forming a through hole 144 at a position near a pad of a power supply system or power supply terminals of the semiconductor devices 143, and thereby the connection with low impedance and low DC resistance become possible. In the case of using such a power supply layer, the wiring board has, even at any portion of 20 mm interval, a DC resistance of several milliohms and an impedance of several hundreds pH or less, which depends on the density of the through holes. A battery 145 with low inductance and small capacity and a battery 146 with large capacity such as an electrolytic capacitor are mounted on a board at appropriate spaces and connected to the power supply layer and the ground layer in parallel. This makes it possible to form a power supply system with low impedance over a wide bandwidth from direct current to several hundreds megaherzes.

Accordingly, the formation of the low impedance power supply system increases flexibility of arrangement of a bypass capacitor or a battery for smoothing power supply, which can reduces the area of the board, thereby achieving miniaturization of the overall magnetic disk drive.

Incidentally, a through-connection portion 147 that extends through and connects the front and back of the metal core wiring board is formed in the electric circuit forming portion, which attains high density of wiring. An electronic component 148 is mounted on and electrically connected to the wiring board 100 by means of solder 149 or a connecting method using metal wires not shown in the figure.

The through hole portions 147 are formed by forming holes in all the soft magnetic metal plate core layers, filling the holes with an insulating material before forming holes that extends through the front and back of the core layer, and forming wiring materials on the inside of the holes with plating to come into conduction. This forming method is the same method as in the coil formation of the stator pole and the electronic circuit forming portion. Thus, since the electronic board portion uses the same layer structure as the stator portion does, both of them are formed as the same board. In the case of making the electronic board portion and the stator portion in the same board, if the thickness of the layer is entirely made uniform, the electronic board portion and the stator portion can simultaneously be fabricated by one manufacturing process.

While silicon iron of about 1.5 T in saturated magnetic flux density is used for the soft magnetic core thin plate material in this embodiment, it may be possible to make the device further thinner by using amorphous material of a larger value in the saturated magnetic flux density.

According to the present invention, it is possible to make a magnetic disk drive thinner without lowering the mechanical strength thereof.

INDUSTRIAL APPLICABILITY

As described above, the present invention is useful to a magnetic disk drive.

What is claimed is:

1. A magnetic disk drive in an enclosure comprising:
    a base constituting at least a face included in the enclosure;
    a shaft secured only to the base;
    a rotor which rotates about the shaft;
    a stator for rotating the rotor, the stator having an annular shape and being circumferentially disposed about a periphery of the rotor and in coplanar relation with the rotor;
    a magnetic disk secured to the rotor; and
    wherein the stator is disposed on a surface of the enclosure opposite the base.

2. A magnetic disk drive according to claim 1, wherein part of a coil of the stator is disposed at a position nearer the base than a magnet of the rotor.

3. A magnetic disk drive according to claim 1, wherein the magnetic disk is disposed between the stator and the base.

4. A magnetic disk drive according to claim 3, wherein part of a magnet of the rotor is disposed at a position nearer the magnetic disk than the stator.

5. A magnetic disk drive according to claim 1, further comprising a metal core board on which an electronic component is mounted,
    wherein the stator includes a core, and the core of the stator is connected to a core of the metal core board.

6. A magnetic disk drive according to claim 5, wherein the core of the stator is integrally formed with the core of the metal core board.

* * * * *